United States Patent
Tong

(10) Patent No.: US 7,145,101 B2
(45) Date of Patent: Dec. 5, 2006

(54) PULSE ARC WELDING OUTPUT CONTROL METHOD AND ARC LENGTH VARIATION PULSE ARC WELDING OUTPUT CONTROL METHOD

(75) Inventor: Hongjun Tong, Osaka (JP)

(73) Assignee: Daihen Corporation, Osaka (JP)

( * ) Notice: Subject to any disclaimer, the term of this patent is extended or adjusted under 35 U.S.C. 154(b) by 214 days.

(21) Appl. No.: 10/937,950

(22) Filed: Sep. 10, 2004

(65) Prior Publication Data

US 2005/0056630 A1   Mar. 17, 2005

(30) Foreign Application Priority Data

| Sep. 12, 2003 | (JP) | ............................. 2003-320826 |
| Sep. 26, 2003 | (JP) | ............................. 2003-335425 |
| Dec. 19, 2003 | (JP) | ............................. 2003-423185 |

(51) Int. Cl.
*B23K 9/09* (2006.01)

(52) U.S. Cl. .............................. 219/130.51

(58) Field of Classification Search ........... 219/130.51, 219/137 PS

See application file for complete search history.

(56) References Cited

U.S. PATENT DOCUMENTS 4,794,232 A * 12/1988 Kimbrough et al. ... 219/130.51

FOREIGN PATENT DOCUMENTS

| EP | 0 478 796 | 4/1992 |
| EP | 1 142 665 A2 | 3/2001 |
| EP | 1 193 019 A2 | 9/2001 |
| EP | 1 413 381 A2 | 10/2003 |
| JP | 2993174 | 10/1999 |
| JP | 2002-361417 | 12/2002 |

* cited by examiner

*Primary Examiner*—Clifford C. Shaw
(74) *Attorney, Agent, or Firm*—Hamre, Schumann, Mueller & Larson, P.C.

(57) ABSTRACT

An output control method is provided for a pulse arc welding in which a welding current flows for one pulse period consisting of a peak period with a flow of a peak current and a base period with a flow of a base current. External characteristics of a welding power source are preliminarily set by a slope Ks, a welding current reference value Is and a welding voltage reference value Vs. The absolute value va of the welding voltage and the absolute value ia of the welding current during welding are detected. The integration $Svb = \int (Ks \times ia - Ks \times Is + Vs - va)\, dt$ is calculated from a starting point of an n-th pulse period. The n-th pulse period is ended when the integration Svb becomes no smaller than zero during the base period. Then, the (n+1)-th pulse period is started.

12 Claims, 14 Drawing Sheets

PRIOR ART

PRIOR ART

PRIOR ART

PRIOR ART

PULSE ARC WELDING OUTPUT CONTROL METHOD AND ARC LENGTH VARIATION PULSE ARC WELDING OUTPUT CONTROL METHOD

BACKGROUND OF THE INVENTION

1. Field of the Invention

The present invention relates to an output control method for pulse arc welding, whereby a welding power source provides the desired external characteristics having a required slope Ks.

2. Description of the Related Art

In the case of pulse arc welding using a consumable electrode, it is extremely important to maintain the arc length during welding at an appropriate value in order to improve the welding quality, e.g., beautiful external appearance of the bead and uniform welding penetration depth. Generally the arc length is determined by the balance between the wire feeding rate and the fusion rate. Accordingly, if the fusion rate, which is substantially proportional to the mean value of the welding current, is equal to the feeding rate, the arc length always remains constant. However, the feeding rate during welding fluctuates as a result of e.g. fluctuations in the rotational speed of the feeding motor, and fluctuations in the frictional force along the feeding path as the welding torch cable is pulled around. As a result, the balance with the fusion rate breaks down so that the arc length varies. Furthermore, the arc length also fluctuates as a result of e.g. fluctuations in the distance between the torch and the matrix due to movement of the hands of the welding operator, or irregular vibration of the welding pool. In order to suppress fluctuations in the arc length caused by such various causes of fluctuation (hereafter referred to as "disturbances"), it is necessary to perform arc length control by constantly adjusting the fusion rate in accordance with the disturbance so that variation of the arc length is suppressed.

In the case of consumable-electrode gas shielded arc welding, among which is consumable-electrode pulse arc welding, a method in which the external characteristics of the welding power source is controlled to desired values is commonly used for suppressing fluctuations in the arc length caused by the disturbances described above. FIG. 9 shows an example of external characteristics. The horizontal axis in the figure shows the mean value Iw of the welding current flowing through the welding wire, while the vertical axis shows the mean value Vw of the welding voltage applied between the welding wire and the matrix. The characteristic L1 shows constant-voltage characteristics in which the slope Ks=0 V/A. The characteristic L2 shows voltage characteristics with the slope Ks=−0.1 V/A, descending to the right. The external characteristics can be expressed as a straight line. Thus, external characteristics passing through the intersection point P0 of the reference value Is of the welding current and the reference value Vs of the welding voltage, and having a slope of Ks, can be expressed by the following equation:

$$Vw = Ks \times (Iw - Is) + Vs \qquad \text{Equation (1)}$$

It has been widely known that the stability of arc length control (called the self-controlling effect) is greatly affected by the slope Ks of the external characteristics of the welding power source. In order to stabilize the arc length against disturbances, it is necessary to control the slope Ks of the external characteristics to an appropriate value in accordance with the welding conditions, including the welding method. For example, in the case of a carbon dioxide gas arc welding method, an appropriate value of the slope Ks is in the range of approximately 0 to −0.03 V/A, while in the case of a pulse arc welding method, such a value is in the range of approximately −0.05 to −0.3 V/A. Accordingly, in the pulse arc welding method that is the object of the present invention, it is necessary to provide the characteristic L2 or the like, with a predetermined slope Ks in the range of approximately −0.05 to −0.3 V/A instead of the characteristic L1, in order to stabilize the arc length control. A conventional method for attaining the external characteristics having the desired slope Ks in pulse arc welding will be described below.

FIG. 10 shows current and voltage waveform diagrams for pulse arc welding. FIG. 10(A) is a waveform diagram of the welding current (instantaneous value) io, and FIG. 10(B) is a waveform diagram of the welding voltage (instantaneous value) vo. The following description will make reference to the figure.

(1) Peak Period Tp from Time t1 to t2

During the predetermined peak period Tp, as shown in FIG. 10(A), a predetermined peak current Ip with a large current value is caused to flow in order to cause a transition of the welding wire into molten droplets. Furthermore, as shown in FIG. 10(B), a peak voltage Vp is applied that is substantially proportional to the arc length during this period.

(2) Base Period Tb from Time t2 to t3

During the base period Tb that is determined by the welding power source output control that will be described later, as shown in FIG. 10(A), a predetermined base current Ib with a small current value is caused to flow in order to prevent the growth of a molten droplet at the tip end of the welding wire; furthermore, as shown in FIG. 10(B), a base voltage Vb is applied that is substantially proportional to the arc length during this period.

Welding is performed by repeating a period from time t1 to t3, comprising the peak period Tp and the base period Tb, as one pulse period Tpb. As shown in FIG. 10(A) the mean value of the welding current for each pulse period Tpb is Iw. Similarly, as shown in FIG. 10(B), the mean value of the welding voltage for each pulse period Tpb is Vw. The output control that is performed in order to form the external characteristics of the welding power source is accomplished by performing feedback control with the time length of the pulse period Tpb used as an operating quantity. Output control is performed by setting the peak period Tp as a fixed value, and increasing or decreasing the pulse period Tpb.

As shown in FIG. 11, the mean value of the welding current for the n-th pulse period Tpb(n) from time t(n) to t(n+1) is Iw(n), and the mean value of the welding voltage for this pulse period is Vw(n). In FIG. 9 as described above, output control is performed so that the intersection point P1 between these values Iw(n) and Vw(n) is located on the characteristic L2. Below, a welding power source output control method that is used to provide external characteristics with a desired slope Ks will be described.

(1) As shown above in FIG. 9, when the slope Ks, welding current reference value Is and welding voltage reference value Vs are set beforehand, the target external characteristics to be provided is expressed by the Equation (1). As shown above in FIG. 10, the peak current Ip, base current Ib and peak period Tp are set beforehand at fixed values.

(2) A first variable $A = Ks \times (Ib - Is)$ and a second variable $B = Ks \times (Ib - Ip) \times Tp$ are calculated.

(3) The welding voltage vo during welding is detected.

(4) The integration $Sva=\int(A+Vs-vo)dt$ of the slope forming voltage error is calculated from the starting time point of the n-th pulse period $Tpb(n)$, and the n-th pulse period $Tpb(n)$ is ended at the time point at which the integration $Sva$ of the slope forming voltage error in the base period following a predetermined pulse period becomes equal to or greater than the value of the second variable B ($Sva \geq B$).

(5) As described above, the external characteristics by Equation (1) can be provided by performing output control of the welding power source.

FIG. 12 is a block diagram of a conventional welding power source provided with an output control function for the purpose of attaining the external characteristics noted above. The blocks will be described below with reference to the figure.

The main power supply circuit, upon receiving a commercial alternating power (three-phase 200 V, for example), performs power control, such as inverter control, in accordance with a current error amplifying signal Ei to be described later, and outputs a welding current io and welding voltage vo that are suitable for welding. The welding wire 1 is supplied via the interior of a welding torch 4 by the rotation of the feeding roll 5 of a wire supply device, and an arc 3 is generated between this welding wire and a matrix material 2. The voltage detection circuit VD detects the welding voltage vo, and outputs a voltage detection signal vd.

The welding current reference value setting circuit IS outputs a predetermined welding current reference value setting signal Is. The welding voltage reference value setting circuit VS outputs a predetermined welding voltage reference value setting signal Vs. The peak current setting circuit IPS outputs a predetermined peak current setting signal Ips. The base current setting circuit IBS outputs a predetermined base current setting signal Ibs. The peak period setting circuit TPS outputs a predetermined peak period setting signal Tps. The first variable calculating circuit CA calculates $Ks \times (Ibs-Is)$, and outputs a first variable calculated value signal Ca. The second variable calculating circuit CB calculates $Ks \times (Ibs-Ips) \times Tps$, and outputs a second variable calculated value signal Cb. The slope forming voltage error integrating circuit SVA performs the integration of $\int (A+Vs-vo) dt$ from the starting time point of the n-th pulse period $Tpb(n)$, and outputs a slope forming voltage error integration signal Sva. The comparison circuit CM outputs a comparative signal Cm that shows a short-time high level when the value of the slope forming voltage error integration signal Sva is equal to or greater than the value of the second variable calculated value signal Cb. Immediately after this, the slope forming voltage error integration signal Sva is reset to zero. Accordingly, the comparative signal Cm is a signal that shows a short-time high level for each pulse period Tpb.

The timer circuit MM outputs a timer signal Mm that shows a high level only during a period determined by the peak period setting signal Tps from the time point at which the comparative signal Cm shifts to a high level. Accordingly, this timer signal Mm is a signal that shows a high level during a predetermined peak period, and that shows a low level during the subsequent base period. The switching circuit SW is switched by this timer signal Mm, and outputs the peak current setting signal Ips or base current setting signal Ibs as the current waveform setting signal Ifs. The current detection circuit ID detects the welding current io, and outputs a current detection signal id. The current error amplifying circuit EI amplifies the error between the current waveform setting signal Ifs and the current detection signal id, and outputs a current error amplifying signal Ei. Accordingly, a welding current io that corresponds to the current waveform setting signal Ifs is caused to flow.

FIG. 13 is a timing chart of the respective signals of the welding power source. FIG. 13(A) shows the variation over time of the welding current io, FIG. 13(B) shows the variation over time of the welding voltage vo, FIG. 13(C) shows the variation over time of the slope forming voltage error integration signal Sva, FIG. 13(D) shows the variation over time of the comparative signal Cm, and FIG. 13(E) shows the variation over time of the timer signal Mm. The following description will make reference to the figure.

When the n-th pulse period $Tpb(n)$ begins at time $t(n)$, the comparative signal Cm varies to a high level for a short time as shown in FIG. 13(D). Accordingly, as shown in FIG. 13(E), the timer signal Mm shifts to a high level for the duration of a predetermined peak period Tp. When this timer signal Mm is at a high level, a peak current Ip flows as shown in FIG. 13(A), and a peak voltage Vp is applied as shown in FIG. 13(B). Furthermore, the integration of Sva is initiated at time $t(n)$ as shown in FIG. 13(C).

As shown in FIG. 13(E), the timer signal Mm shifts to a low level when the predetermined peak period Tp has elapsed. Consequently, as shown in FIG. 13(A), a base current Ib flows; furthermore, a base voltage Vb is applied as shown in FIG. 13(B). When $SVA \geq B$ at time $t(n+1)$, the comparative signal Cm again shifts to a high level for a short time as shown in FIG. 13(D), and the (n+1)-th pulse period $Tpb(n+1)$ is begun. Welding power source output control is performed by repeating the operation, so that the external characteristics of the Equation (1) are provided. Prior art documents relating to the above technique include Japanese Patent Application Laid-Open No. 2002-361417, for example.

As described above, in pulse arc welding output control methods of the prior art, external characteristics with a desired slope can be provided. However, as a prerequisite condition for that, the peak current Ip in the peak period and the base current Ib in the base period need be constant. In the case of the direct-current pulse arc welding described above with reference to FIG. 10, this prerequisite condition is satisfied so that the conventional method is applicable. However, in the case of the alternating-current pulse arc welding that will be described below, the base current Ib during the base period does not remain constant, but varies, and therefore the prerequisite condition is not met. Consequently, the conventional method cannot be used for the alternating-current pulse arc welding.

FIG. 14 is a current-voltage waveform diagram of the alternating-current pulse arc welding. FIG. 14(A) is a waveform diagram of the welding current io, FIG. 14(B) is a waveform diagram of the absolute value ia of the welding current, FIG. 14(C) is a waveform diagram of the welding voltage, and FIG. 14(D) is a waveform diagram of the absolute value va of the welding voltage. The following description will make reference to these diagrams.

In the alternating-current pulse arc welding, the voltage polarity in a partial period (time t21 to time t22) in the base period Tb from time t2 to time t3 is reversed, so that a minus electrode period Ten is formed. Specifically, during the first base period Tb1 from time t2 to t21, a first base current Ib1 with an electrode plus polarity flows as shown in FIG. 14(A), and a first base voltage Vb1 is applied as shown in FIG. 14(C). Then, during the minus electrode period Ten from time t21 to t22, a minus electrode current Ien with a minus electrode polarity flows, and an electrode minus voltage Ven is applied. Ten, during the second base period Tb2 from t22 to t3, a second base current Ib2 with an electrode plus polarity again flows, and a second base voltage Vb2 is applied.

The welding current mean value Iw and welding voltage mean value Vw in the case of such an alternating-current waveform are defined as follows. As shown in FIG. 14(B), the mean value of the absolute value ia of the welding current for each pulse period is the welding current mean value Iw. Similarly, as shown in FIG. 14(D), the mean value of the absolute value va of the welding voltage or each pulse period is the welding voltage mean value Vw. Accordingly, it is necessary to perform output control so that the intersection point of the welding current mean value Iw and welding voltage mean value Vw during the pulse period Tpb from time t1 to t3 is located on the desired external characteristic.

In the alternating-current pulse arc welding, as shown in FIG. 14(B), the base current Ib1 during the base period Tb varies as Ib1, |Ien|, Ib2, and is thus not a constant value. Accordingly, the prerequisite condition of the conventional method is not met, and therefore the conventional method is not applicable to the alternating-current pulse arc welding.

SUMMARY OF THE INVENTION

In light of the above, the present invention provides a pulse arc welding output control method that can provide external characteristics with a desired slope even in cases where peak current during the peak period and the base current during the base period are not constant.

According to a first aspect of the present invention, there is provided an output control method for a pulse arc welding in which welding is performed by causing a welding current to flow for one pulse period including a peak period with a flow of a peak current and a base period with a flow of a base current, and by applying a welding voltage between a welding wire and a matrix material. The method comprises the steps of: preliminarily setting external characteristics of a welding power source by a slope Ks, a welding current reference value Is and a welding voltage reference value Vs; detecting an absolute value va of the welding voltage and an absolute value ia of the welding current during welding; calculating integration Svb=∫ (Ks×ia−Ks×Is+Vs−va) dt from a starting point of an n-th pulse period; ending the n-th pulse period when the integration Svb becomes no smaller than zero during a base period following a predetermined peak period; and starting a (n+1)-th pulse period subsequent to the n-th pulse period.

With such an arrangement, it is possible to provide the desired external characteristics with a required slope even in cases where the peak current and/or the base current are not constant. By providing optimum external characteristics corresponding to the welding conditions, it is possible to suppress fluctuations in the arc length caused by disturbances, so that a good welding quality can be obtained.

Preferably, a current waveform setting value for setting a welding current waveform may be used in place of the absolute value ia of the welding current. In this manner, the above-described advantages can also be enjoyed.

Preferably, the external characteristics may comprise high-arc-length characteristics for making an arc length relatively long and low-arc-length characteristics for making the arc length relatively short, wherein the high-arc-length characteristics and the low-arc-length characteristics are periodically switched for varying the arc length periodically.

In the above case, the high-arc-length characteristics may be preliminarily set by a slope HKs, a welding current reference value HIs and a welding voltage reference value HVs, while the low-arc-length characteristics may be preliminarily set by a slope LKs, a welding current reference value LIs and a welding voltage reference value LVs, wherein at least one of the non-equal relations HVs LVs and HIs LIs is satisfied.

With such an arrangement, it is possible to perform "pulse arc welding with arc length variation" by switching the two kinds of external characteristics. In this welding, the two kinds of characteristics having different slopes can be properly provided even in cases where the peak current and/or the base current are not constant. Accordingly, the arc-length-variable pulse arc welding can be performed stably.

According to a second aspect of the present invention, there is provided an output control method for a pulse arc welding in which welding is performed by causing a welding current to flow for one pulse period including a base period with a flow of a base current and a peak period with a flow of a peak current, and by applying a welding voltage between a welding wire and a matrix material. The method comprises the steps of: preliminarily setting external characteristics of a welding power source by a slope Ks, a welding current reference value Is and a welding voltage reference value Vs; detecting an absolute value va of the welding voltage and an absolute value ia of the welding current during welding; calculating integration Svb=∫(Ks× ia−Ks×Is+Vs−va) dt from a starting point of an n-th pulse period; ending the n-th pulse period when the integration Svb becomes no greater than zero during a peak period following a predetermined base period; and starting a (n+1)-th pulse period subsequent to the n-th pulse period.

With such an arrangement, the advantages described above with the first aspect of the present invention can be enjoyed even in cases where any one pulse period starts with a base period having a fixed time length, while the peak period has a variable time length.

Preferably, a current waveform setting value for setting a welding current waveform may be used in place of the absolute value ia of the welding current.

Preferably, the external characteristics may comprise high-arc-length characteristics for making an arc length relatively long and low-arc-length characteristics for making the arc length relatively short, wherein the high-arc-length characteristics and the low-arc-length characteristics are periodically switched for varying the arc length periodically. In this case again, the high-arc-length characteristics may be preliminarily set by a slope HKs, a welding current reference value HIs and a welding voltage reference value HVs, and the low-arc-length characteristics may be preliminarily set by a slope LKs, a welding current reference value LIs and a welding voltage reference value LVs. At least one of the non-equal relations HVs LVs and HIs LIs may be satisfied.

According to a third aspect of the present invention, there is provided an output control method for a pulse arc welding in which welding is performed by causing a welding current to flow for one pulse period including a minus electrode period with a flow of a minus electrode current, a plus electrode peak period with a flow of a peak current and a base period with a flow of a base current, and by applying a welding voltage between a welding wire and a matrix material. The method comprises the steps of: preliminarily setting external characteristics of a welding power source by a slope Ks, a welding current reference value Is and a welding voltage reference value Vs; detecting an absolute value va of the welding voltage and an absolute value ia of the welding current during welding; calculating integration Svb=∫(Ks×ia−Ks×Is+Vs−va) dt from a starting point of an n-th pulse period; ending the n-th pulse period when the integration Svb becomes no smaller than zero during a base period following a predetermined minus electrode period and a predetermined peak period; and starting a (n+1)-th pulse period subsequent to the n-th pulse period.

With such an arrangement, the above-described advantages can also be obtained in an alternating-current pulse arc welding method in which output control of the welding power source is performed with the pulse period beginning from predetermined minus electrode period and peak period, and with a variable base period.

Preferably, a current waveform setting value for setting a welding current waveform may be used in place of the absolute value ia of the welding current.

Preferably, the external characteristics may comprise high-arc-length characteristics for making an arc length relatively long and low-arc-length characteristics for making the arc length relatively short, wherein the high-arc-length characteristics and the low-arc-length characteristics are periodically switched for varying the arc length periodically. In this case again, the high-arc-length characteristics may be preliminarily set by a slope HKs, a welding current reference value HIs and a welding voltage reference value HVs, while the low-arc-length characteristics may be preliminarily set by a slope LKs, a welding current reference value LIs and a welding voltage reference value LVs, wherein at least one of the non-equal relations HVs LVs and HIs LIs is satisfied.

DESCRIPTION OF THE PREFERRED EMBODIMENTS

Embodiments of the present invention will be described below with reference to the accompanying drawings.

The external characteristic forming method of the present invention will be described with reference to the waveform diagram of the alternating-current pulse arc welding shown in FIG. 14. The target external characteristics to be provided are the external characteristics expressed by the Equation (1). The welding current mean value Iw and welding voltage mean value Vw in the n-th pulse period Tpb(n) can be expressed by the following equations.

$Iw=(1/Tpb(n))\times \int ia\, dt \ldots$  Equation (2)

$Vw=(1/Tpb(n))\times \int va\, dt \ldots$  Equation (3)

Here, integration is performed over the interval of the n-th pulse period Tpb(n), and ia is the absolute value of the welding current, and va is the absolute value of the welding voltage.

If these Equations (2) and (3) are substituted into the Equation (1) and rearranged, the following equation is obtained.

$\int (Ks\times ia-Ks\times Is+Vs-va)dt=0 \ldots$  Equation (4)

Here, integration is performed over the interval of the n-th pulse period Tpb(n), Ks is the slope of the external characteristics, Is is the welding current reference value, and Vs is the welding voltage reference value.

The Equation (4) holds true at the time point at which the n-th pulse period Tpb(n) ends. Here, if the left side of the Equation (4) is defined as the integration Svb, then the following equation is obtained.

$Svb=\int (Ks\times ia-Ks\times Is+Vs-va)dt \ldots$  Equation (5)

Figure 10:
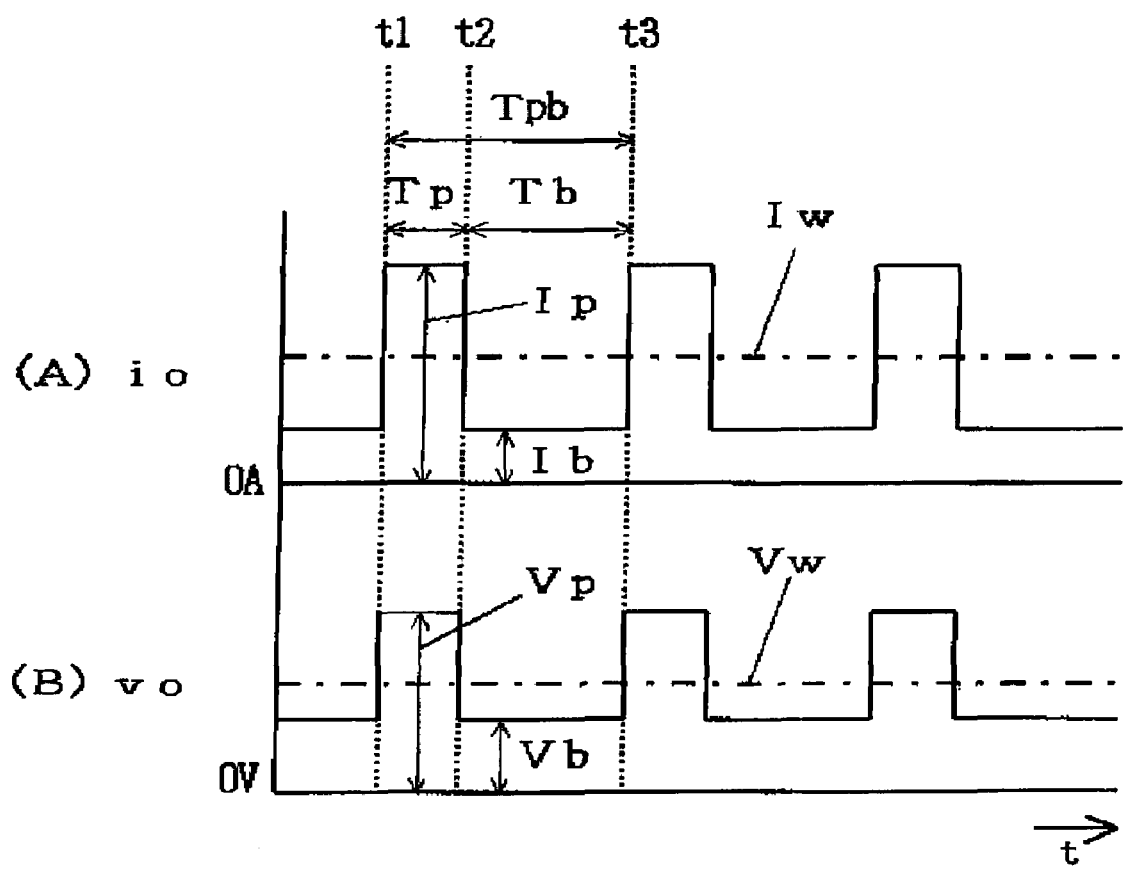
FIG. 10 is a current-voltage waveform diagram of pulse arc welding in the prior art.
Figure 11:
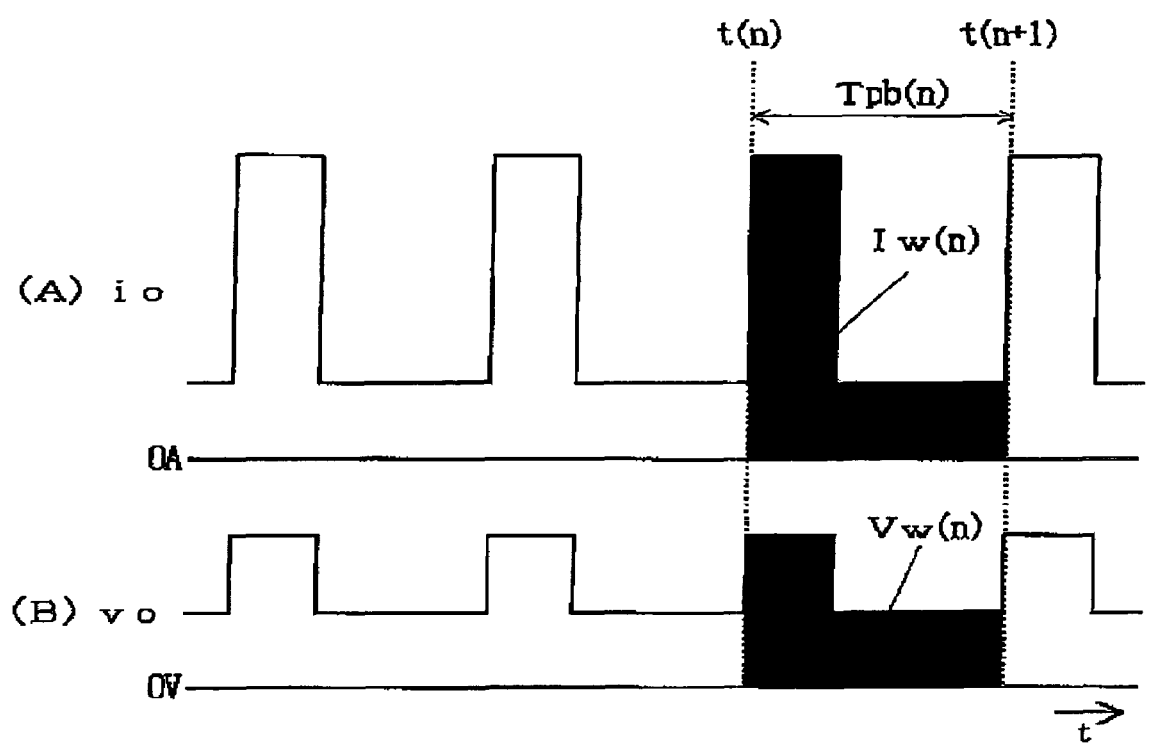
FIG. 11 is a current-voltage waveform diagram showing an external characteristic forming method in the prior art.

Calculation of the integrate value Svb of the Equation (5) is begun from the time point at which the n-th pulse period Tpb(n) begins. The nth pulse period Tpb(n) is ended at the time point at which the integration Svb=0 (or Svb≧0) in the n-th base period following the ending of the n-th predetermined peak period. The external characteristics of the Equation (1) can be provided by repeating this operation. The calculation formula for the integration Svb of the Equation (5) does not include the prerequisite condition of a constant peak current Ip and base current Ib. Accordingly, this method is applicable to the alternating-current pulse arc welding shown in FIG. 14. Naturally, this method is applicable to the direct-current pulse arc welding shown above in FIG. 10. Thus, the method can be widely applied to pulse arc welding.

The external characteristic forming method of the present invention is summarized below.

(1) The target welding power source external characteristics are set beforehand using the slope Ks, welding current reference value Is and welding voltage reference value Vs.

(2) The absolute value va of the welding voltage and absolute value ia of the welding current during welding are detected.

(3) The calculation of the integration $Svb=\int (Ks\times ia-Ks\times Is+Vs-va)dt$ is begun from the starting time point of the n-th pulse period Tpb(n).

(4) The n-th pulse period Tpb(n) is ended at the time point at which the integration Svb in the n-th base period Tb following the n-th predetermined peak period Tp becomes zero or greater (Svb≧0).

(5) Then, the (n+1)-th pulse period Tbp(n+1) is begun, and the desired external characteristics are provided by repeating the operations of the (3) and (4).

Figure 1:
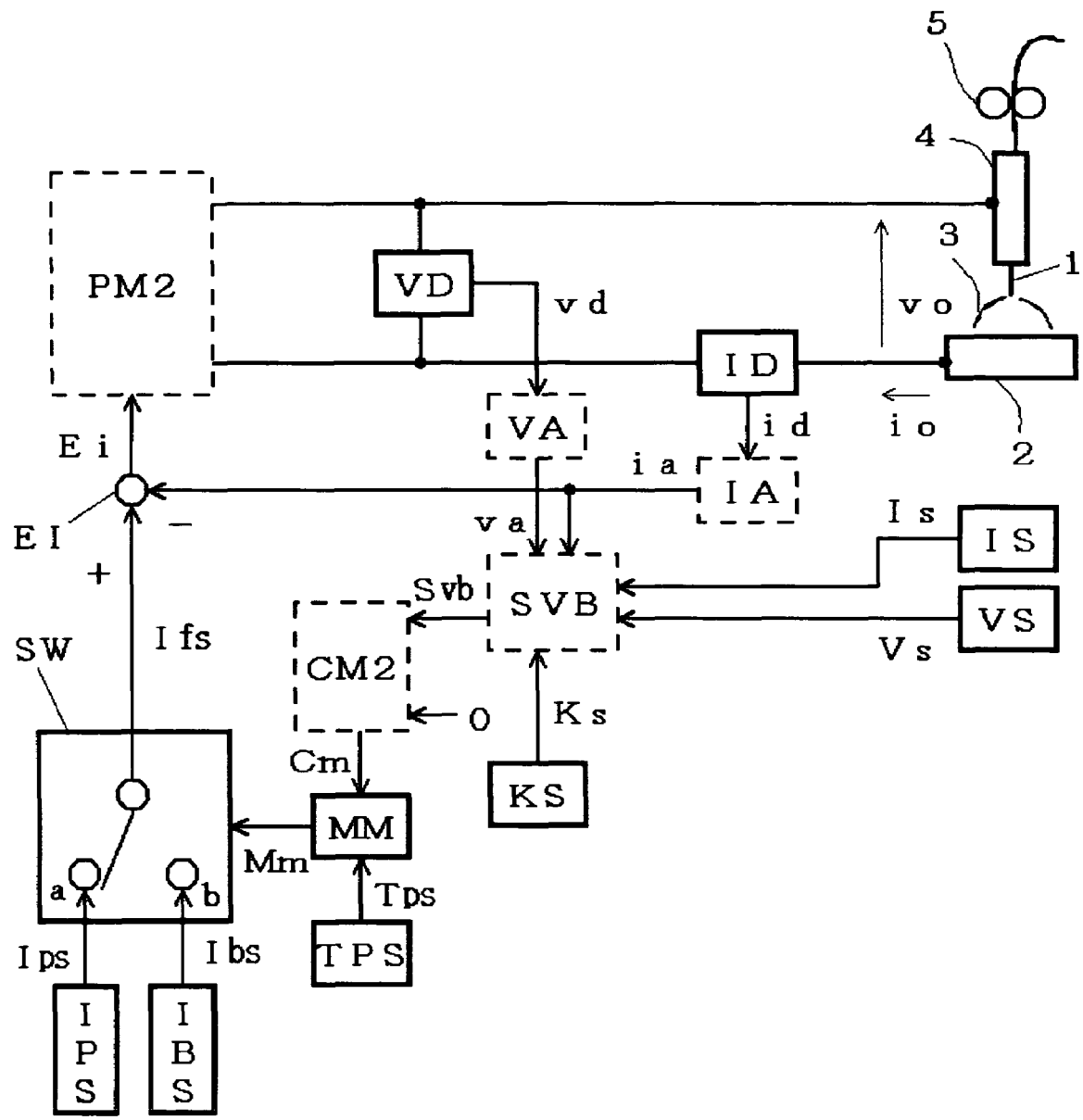
FIG. 1 is a block diagram of the welding power source according to an embodiment of the present invention.
Figure 12:
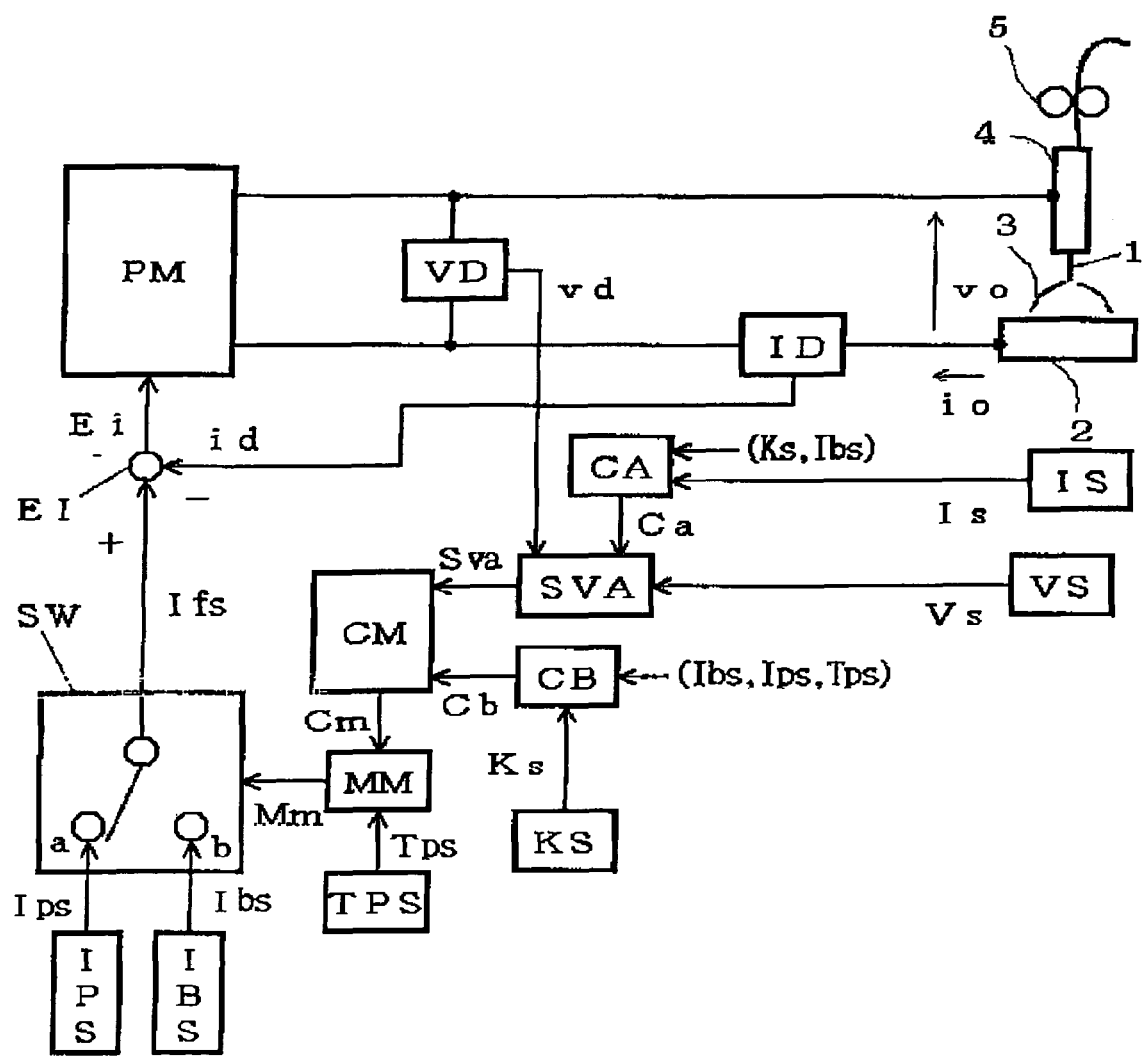
FIG. 12 is a block diagram of a welding power source in the prior art.
Figure 13:
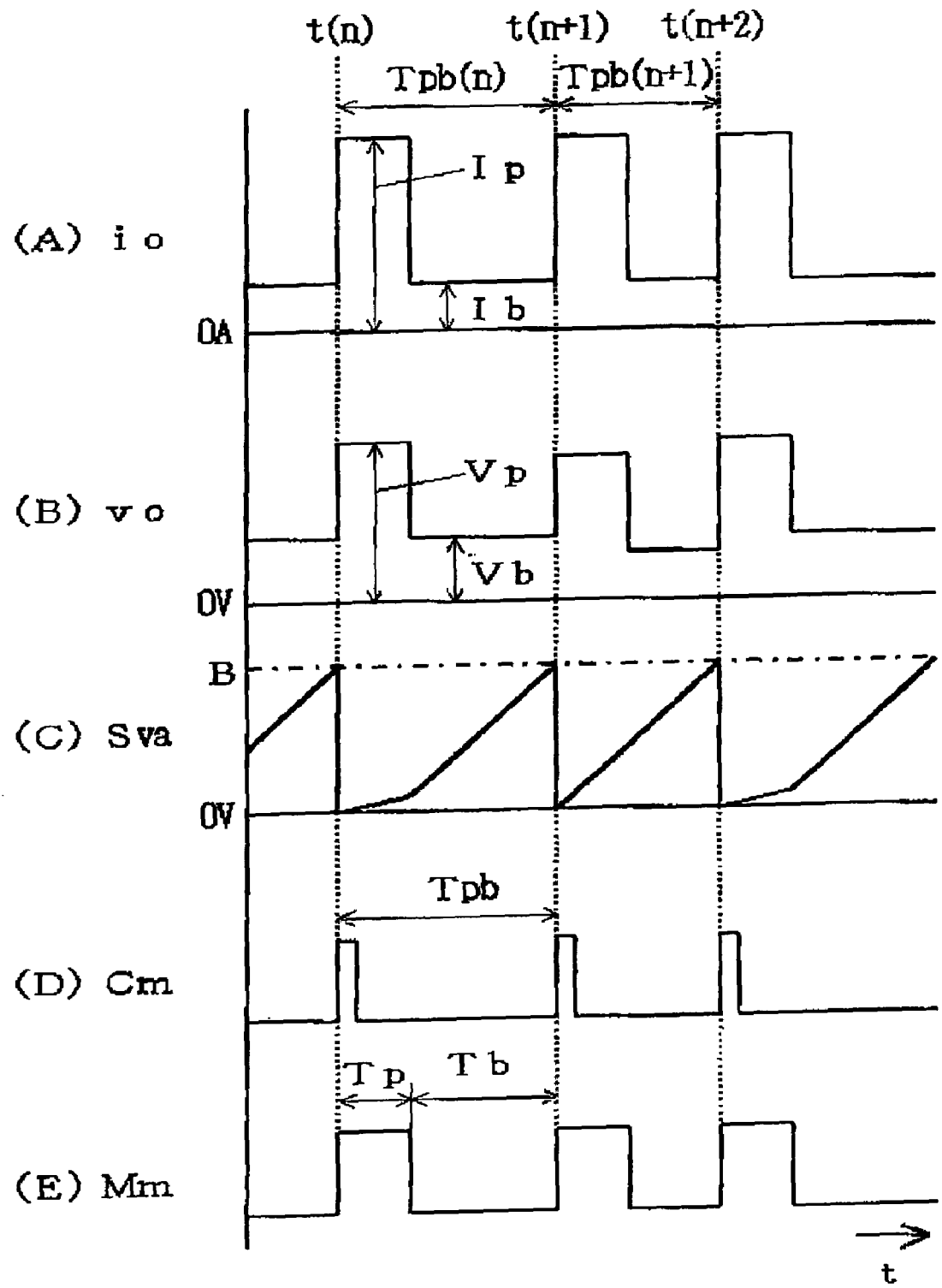
FIG. 13 is a timing chart of the signals of the welding power source shown in FIG. 12.

FIG. 1 is a block diagram of a welding power source using the external characteristic forming method of the present invention. In this figure, blocks that are the same as in the conventional device shown in FIG. 12 are labeled with the same symbols, and a description of these blocks is omitted. Blocks indicated by a dotted line, which differ from the blocks shown in FIG. 12, will be described below.

The second power supply main circuit PM2 outputs a welding current io and welding voltage vo that are used for direct-current pulse arc welding or alternating-current pulse arc welding. Specifically, a current with the welding current waveform shown above in FIGS. 10 and 14 is caused to flow. The welding voltage absolute value circuit VA calculates the absolute value of the voltage detection signal vd, and outputs a welding voltage absolute value signal va. The welding current absolute value circuit IA calculates the absolute value of the current detection signal id, and outputs a welding current absolute value signal ia. The integrating circuit SVB begins the calculation of the integration Svb defined by the Equation (5) from the starting time point of the pulse period, and outputs an integration signal. The second comparison circuit CM2 outputs a comparative signal Cm that shows a short-time high level at the time point at which $Svb \geq 0$ in the pulse period.

Figure 2:
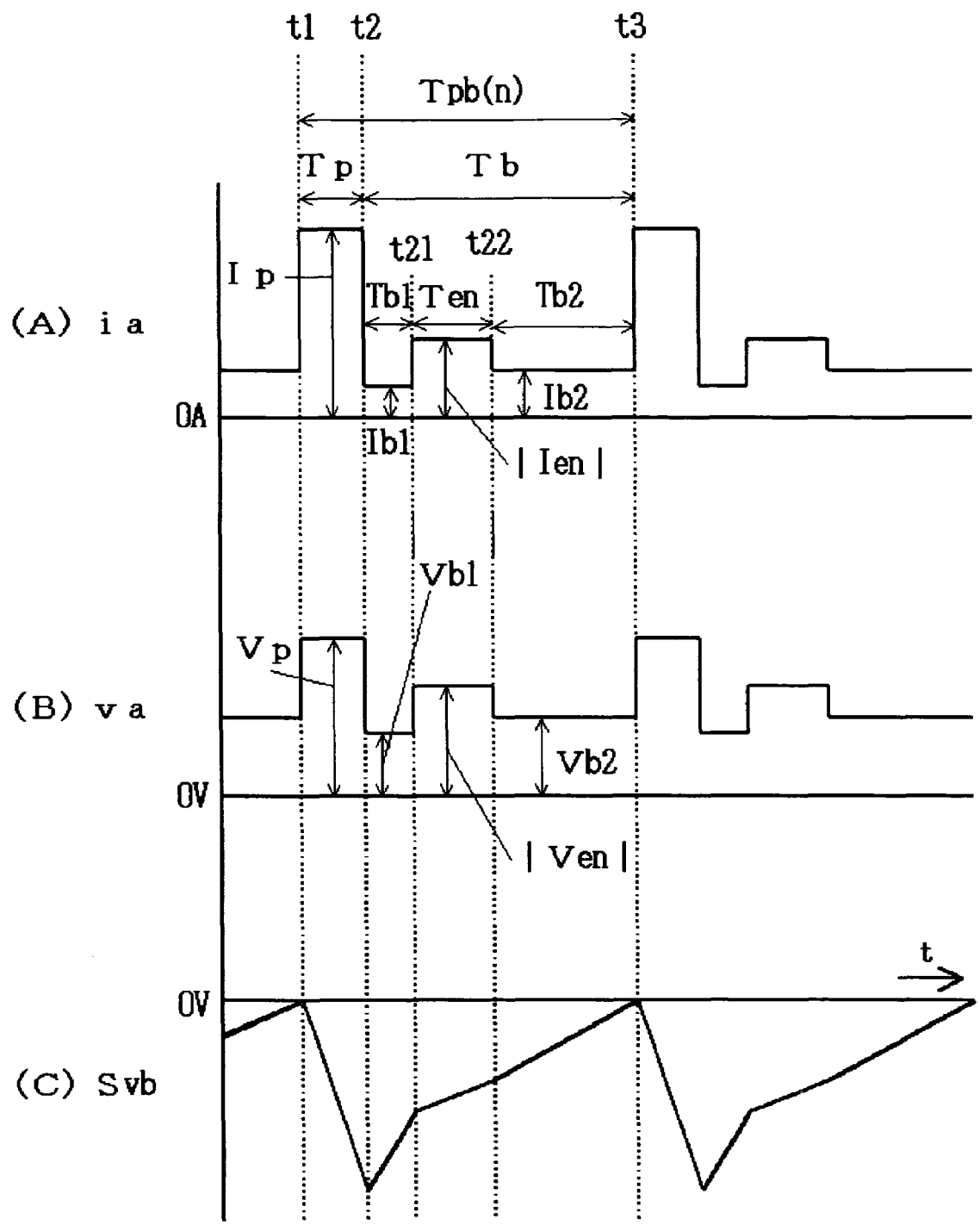
FIG. 2 is a timing chart of the signals of the welding power source shown in FIG. 1.

FIG. 2 is a timing chart of the respective signals of the welding power source. FIG. 2(A) shows the variation over time of the absolute value ia of the welding current, FIG. 2(B) shows the variation over time of the absolute value va of the welding voltage, and FIG. 2(C) shows the variation over time of the integration signal Svb. The following description will make reference to the figure.

(1) Peak Period Tp from Time t1 to t2

When the n-th pulse period Tpb(n) begins at time t1, a peak current Ip flows during a predetermined peak period Tp up to time t2 as shown in FIG. 2(A), and a peak voltage Vp is applied as shown in FIG. 2(B). At the same time, from time t1, the calculation of the integration signal Svb is begun as shown in FIG. 2(C). The variation of the integration signal Svb during this period is as follows. In $Svb = \int(Ks \times ia - Ks \times Is + Vs - va)dt$, it is ordinarily the case that $Ks \leq 0$, and Is and Vs are set at values in the vicinity of the mean values. Accordingly, ia=Ip>Is, and va=Vp>Vs. As a result, (Ks×ia−Ks×Is+Vs−va)<0; accordingly, the integration signal Svb varies so that the negative value gradually increases as shown in FIG. 2 (C).

(2) First Base Period Tb1 from Time t2 to t21

As shown in FIG. 2(A), a first base current Ib1 flows during the predetermined first base period Tb1 from time t2 to t21; furthermore, as shown in FIG. 2(B), a second base voltage Vb2 is applied. The variation of the integration signal Svb during this period is as follows. In $Svb = \int(Ks \times ia - Ks \times Is + Vs - va)dt$, it is ordinarily the case that $Ks \leq 0$, and Is and Vs are set at values in the vicinity of the mean values. Accordingly, ia=Ib1<Is, and va=Vb1<Vs. As a result, (Ks×ia−Ks×Is+Vs−va)>0; accordingly, the integration signal Svb varies so that the negative value gradually decreases as shown in FIG. 2(C).

(3) Minus Electrode Period Ten from Time t21 to t22

As shown in FIG. 2(A), a minus electrode current Ien flows during the predetermined minus electrode period Ten from time t21 to t22; furthermore, as shown in FIG. 2(B), an electrode minus voltage Ven is applied. The variation of the integration signal Svb during this period is as follows. In $Svb = \int(Ks \times ia - Ks \times Is + Vs - va)dt$, it is ordinarily the case that $Ks \leq 0$, and Is and Vs are set at values in the vicinity of the mean values. Accordingly, ia=|Ien|<Is, and va=|Ven|<Vs. As a result, (Ks×ia−Ks×Is+Vs−va)>0; accordingly, the integration signal Svb varies so that the negative value gradually decreases as shown in FIG. 2(C).

(4) Second Base Period Tb2 from Time t22 to t3

As shown in FIG. 2(A), a second base current Ib2 flows during the second base period Tb2 from time t22 to t3; furthermore, as shown in FIG. 2(B), a second base voltage Vb2 is applied. The variation of the integration signal Svb during this period is as follows. In $Svb = \int(Ks \times ia - Ks \times Is + Vs - va)dt$, it is ordinarily the case that $Ks \leq 0$, and Is and Vs are set at values in the vicinity of the mean values. Accordingly, ia=Ib2<Is, and va=Vb2<Vs. As a result, (Ks×ia−Ks×Is+Vs−va)>0; accordingly, the integration signal Svb varies so that the negative value gradually decreases, and reaches zero at time t3, as shown in FIG. 2(C).

As described above, the n-th pulse period Tpb(n) ends when the integration signal Svb>0. The desired external characteristics can be obtained by repeating these operations.

Figure 3:
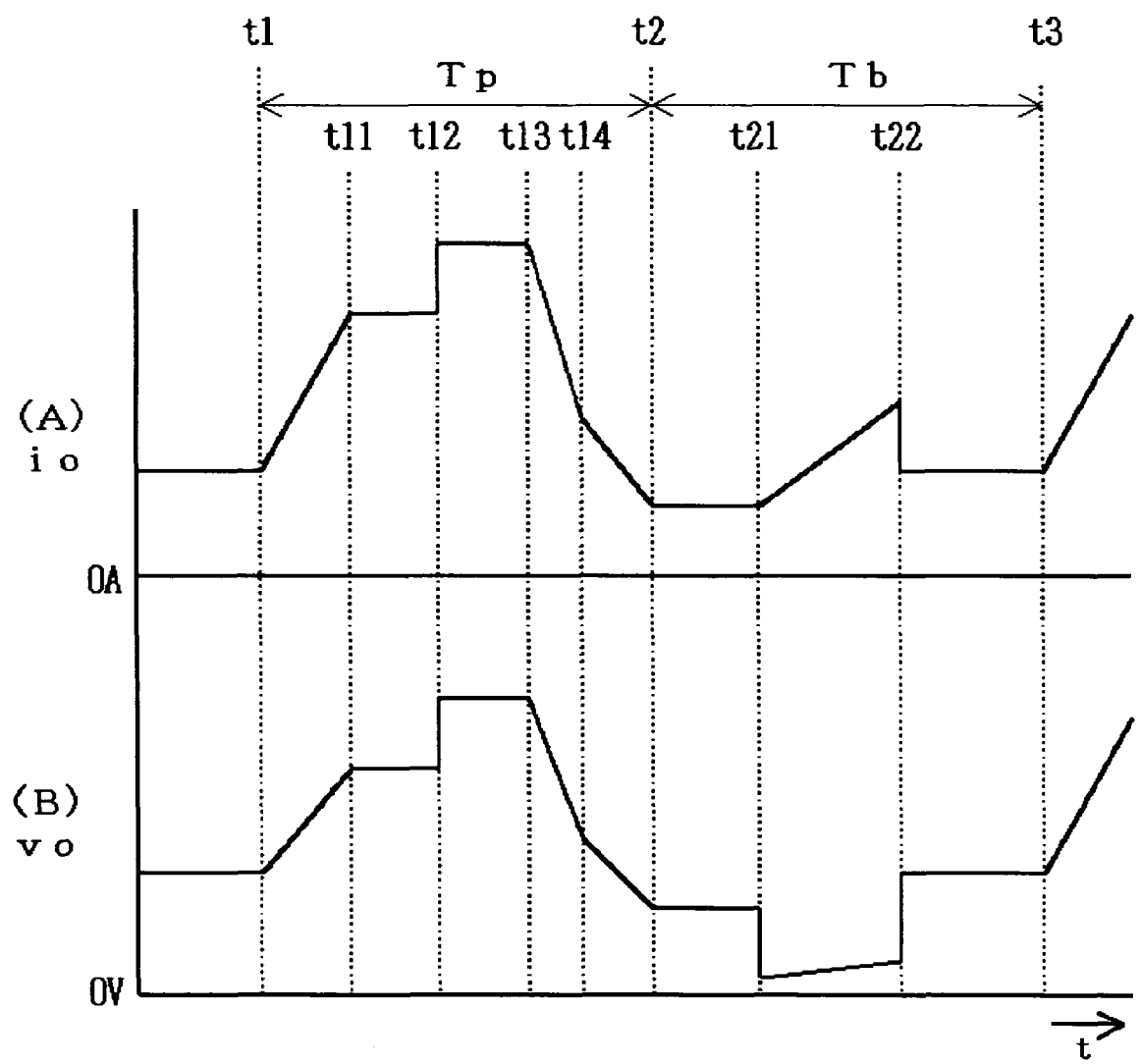
FIG. 3 is a current-voltage waveform diagram of pulse arc welding that can be performed using the output control method of the present invention.

Furthermore, the pulse arc welding output control method of the present invention can be applied not only to the current-voltage waveforms shown above in FIGS. 10 and 14, but also the current-voltage waveform shown in FIG. 3. FIG. 3(A) is a waveform diagram of the welding current io, and FIG. 3(B) is a waveform diagram of the welding voltage vo. The peak period Tp from time t1 to t2 comprises a peak rise period from time t1 to t11, a first peak period from time t11 to t12, a second peak period from time t12 to t13, a first peak fall period from time t13 to t14, and a second peak fall period from time t14 to t2. Thus, the peak current during the peak period is not a fixed value, but instead varies greatly. The subsequent base period from time t2 to t3 comprises a first base period from time t2 to t21, a second base period from time t21 to t22, and a third base period from time t22 to t3. Thus, the base current during the base period is not a fixed value, but varies greatly. The present invention that has been described above can be used even in cases where the peak current and base current vary greatly; accordingly, the present invention can also be used in the case of the figure.

In the welding power source shown above in FIG. 1, the absolute value ia of the welding current is set according to the current waveform setting signal Ifs; consequently, both signals have the same meaning. Thus, Ifs can be used instead of ia in Equation (5).

Figure 4:
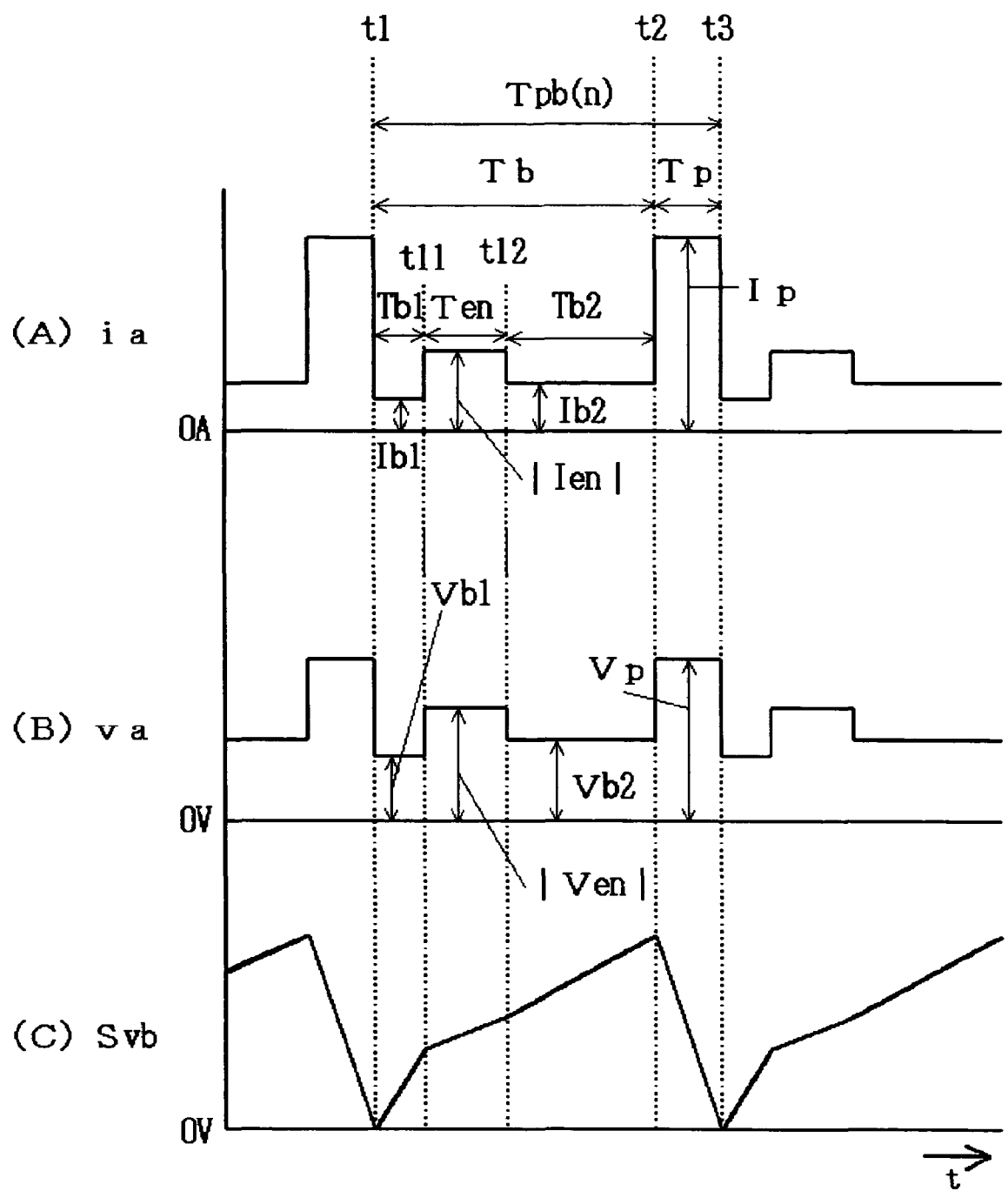
FIG. 4 is a timing chart corresponding to FIG. 2 which shows an external characteristic forming method used in cases where the pulse period comprises a predetermined base period and a varying peak period.

FIG. 4 is a timing chart showing a case in which the pulse period Tpb in FIG. 2 begins from the base period Tb. In FIG. 2, the pulse period Tpb begins from a predetermined peak period Tp, and then makes a transition to a base period Tb, and the base period Tb ends at the time point at which the integration signal $Svb \geq 0$. In FIG. 4, on the other hand, the pulse period Tpb begins from a predetermined base period Tb, and then makes a transition to a peak period Tp, and the peak period Tp ends at the time point at which the integration signal $Svb \leq 0$. As shown in FIG. 4(B), the value of the integration signal Svb rises from zero and becomes a positive value during the base period Tb from time t1 to t2, and then falls during the peak period Tp from time t2 to t3, and returns to zero at time t3. Accordingly, if the peak period Tp is ended at the time point at which the integration signal $Svb \leq 0$ in the peak period Tp, the desired external characteristics can be provided.

The external characteristic forming method in FIG. 4 is summarized below.

(1) The target welding power source external characteristics are set beforehand using the slope Ks, welding current reference value Is and welding voltage reference value Vs.

(2) The absolute value va of the welding voltage and absolute value ia of the welding current during welding are detected.

(3) The calculation of the integration $Svb = \int (Ks \times ia - Ks \times Is + Vs - va)dt$ is begun from the starting time point of the n-th pulse period Tpb(n).

(4) The n-th pulse period Tpb(n) is ended at the time point at which the integration Svb in the n-th peak period Tp following the n-th predetermined base period Tb becomes zero or less ($Svb \leq 0$).

(5) Then, the (n+1)-th pulse period Tbp(n+1) is begun, and the desired external characteristics are provided by repeating the operations of the (3) and (4).

Figure 5:
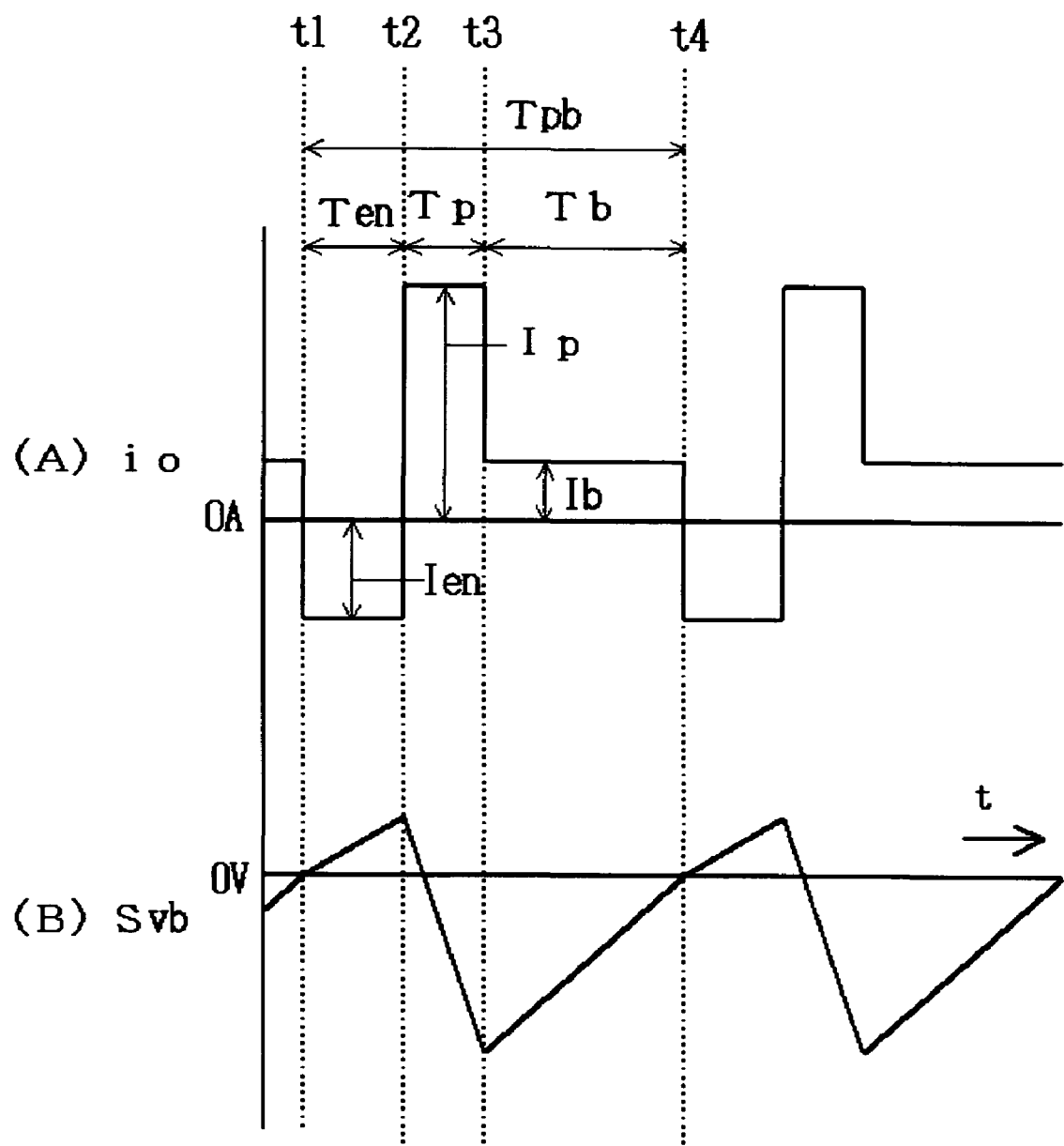
FIG. 5 is a waveform diagram showing an external characteristic forming method used in cases where the pulse period comprises a predetermined minus electrode period and predetermined peak period, and a varying base period.
Figure 14:
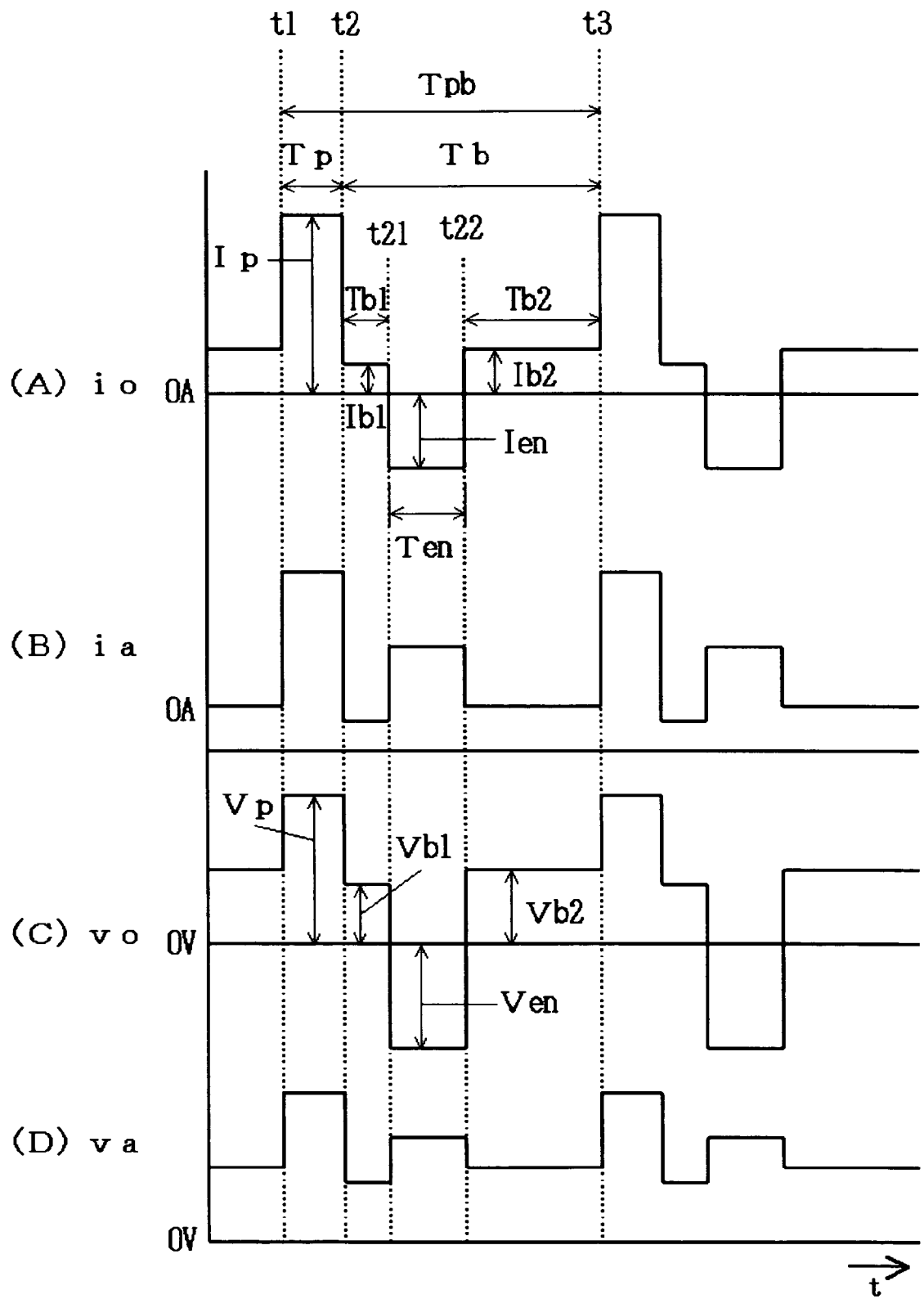
FIG. 14 is a current-voltage waveform diagram of alternating-current pulse arc welding for describing the problems.

FIG. 5 is a waveform diagram showing an external characteristic forming method used in a case where the pulse period Tpb in FIG. 14 is begun from the minus electrode period Ten. FIG. 5(A) is a waveform diagram of the welding current io, and FIG. 5(B) is a waveform diagram of the integration signal Svb. In FIG. 14, the pulse period Tpb begins from a predetermined peak period Tp, and then makes a transition to a base period Tb that includes a predetermined minus electrode period Ten, and the base period Tb is ended at the time point at which the integration signal $Svb \geq 0$ in the base period Tb. In FIG. 5, on the other hand, the pulse period Tpb begins from a predetermined minus electrode period Ten, and then makes a transition to a base period Pb via a predetermined peak period Tp, and the base period Tb is ended at the time point at which the integration signal $Svb \geq 0$ in the base period Tb. As shown in FIG. 5(B), the value of the integration signal Svb rises from zero and becomes a positive value during the minus electrode period Ten from time t2 to t3, then drops and becomes a negative value during the peak period Tp from time t2 to t3, and then rises during the base period Tb from time t3 to t4, and returns to zero at time t4. Accordingly, if the base period Tb is ended at the time point at which the integration signal $Svb \geq 0$ in the base period Tb, the desired external characteristics can be provided.

The external characteristic forming method shown in this figure is summarized below.

(1) The target welding power source external characteristics are set beforehand using the slope Ks, welding current reference value Is and welding voltage reference value Vs.

(2) The absolute value va of the welding voltage and absolute value ia of the welding current during welding are detected.

(3) The calculation of the integration $Svb = \int (Ks \times ia - Ks \times Is + Vs - va) dt$ is begun from the starting time point of the n-th pulse period Tpb(n).

(4) The n-th pulse period Tpb(n) is ended at the time point at which the integration Svb in the n-th base period Tb following the n-th predetermined minus electrode period Ten and predetermined peak period Tp becomes zero or greater ($Svb \geq 0$).

(5) Then, the (n+1)-th pulse period Tbp(n+1) is begun, and the desired external characteristics are provided by repeating the operations of the (3) and (4).

[Other Embodiment]

Arc length oscillating pulse arc welding methods in which welding is performed with the arc length caused to vary up and down periodically by periodically switching the external characteristics of the welding power source have been used (for example, see Japanese Patent No. 2993174). In such welding methods, the arc lengths corresponding to respective external characteristics are switched by switching the external characteristics at a low frequency of several hertz to several tens of hertz, so that the arc length is caused to vary. If such a welding method is used, a beautiful scale-form bead can be obtained by causing the arc length to vary so that the arc shape is varied. Furthermore, if such a welding method is used, the following effect is also obtained: namely, the molten pool can be agitated by causing the arc length to vary so that the arc force is varied. As a result, gases contained in the molten pool can be released, so that the generation of blow holes can be suppressed. A case in which the pulse arc welding output control method of the present invention is applied to such arc length variation pulse arc welding will be described below.

Figure 6:
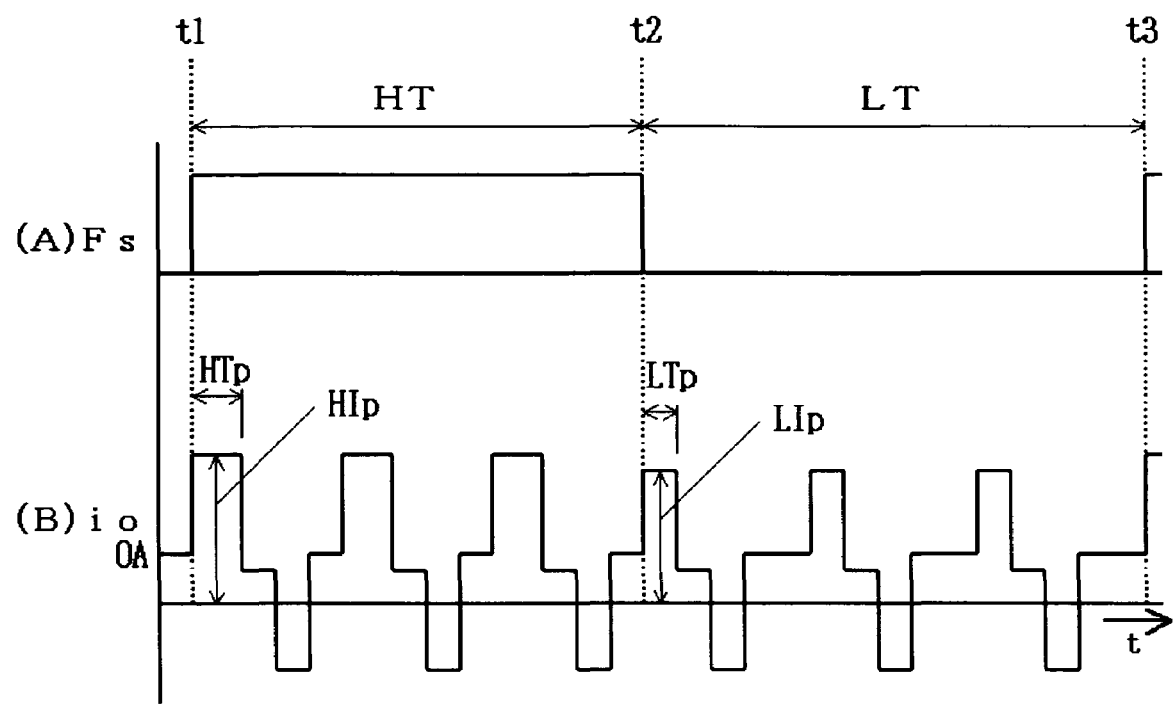
FIG. 6 is a current waveform diagram of arc length variation pulse arc welding according to another embodiment of the present invention.

FIG. 6 is a current waveform diagram of arc length variation pulse arc welding. FIG. 6(A) shows the variation over time of the arc length switching signal Fs, and FIG. 6(B) shows the variation over time of the welding current io. This figure shows a case in which the pulse arc welding is the alternating-current pulse arc welding shown above in FIG. 14. The following description will make reference to FIG. 6.

As shown in FIG. 6(A), when the arc length switching signal Fs assumes a high level during the predetermined period from time t1 to t2 (hereafter referred to as the "high arc length period HT"), the external characteristics of the welding power source are high-arc-length characteristics, and the arc length is in a high state, or long. When the arc length switching signal Fs assumes a low level during the predetermined period from time t2 to t3 (hereafter referred to as the "low arc length period LT"), the external characteristics of the welding power source are low-arc-length characteristics, and the arc length is in a low state, or short. Furthermore, as shown in FIG. 6(B), a welding current io comprising a high peak period HTp and a high peak current HIp flows during the high arc length period HT. Furthermore, as is also shown in FIG. 6 (B), a welding current io comprising a low peak period Ltp and a low peak current LIp flows during the subsequent low arc length period LT. Ordinarily, $HTp \geq LTp$, and $HIp \geq LIp$.

During the high arc length period HT, arc length control that is stabilized by the high-arc-length characteristics is performed, so that the arc length is stably maintained in a high state. During the low arc length period, arc length control that is stabilized by the low-arc-length characteristics is performed, so that the arc length is stably maintained in a low state. The high arc length period HT and low arc length period LT are usually set at a value of several tens of milliseconds to several hundred milliseconds.

Figure 7:
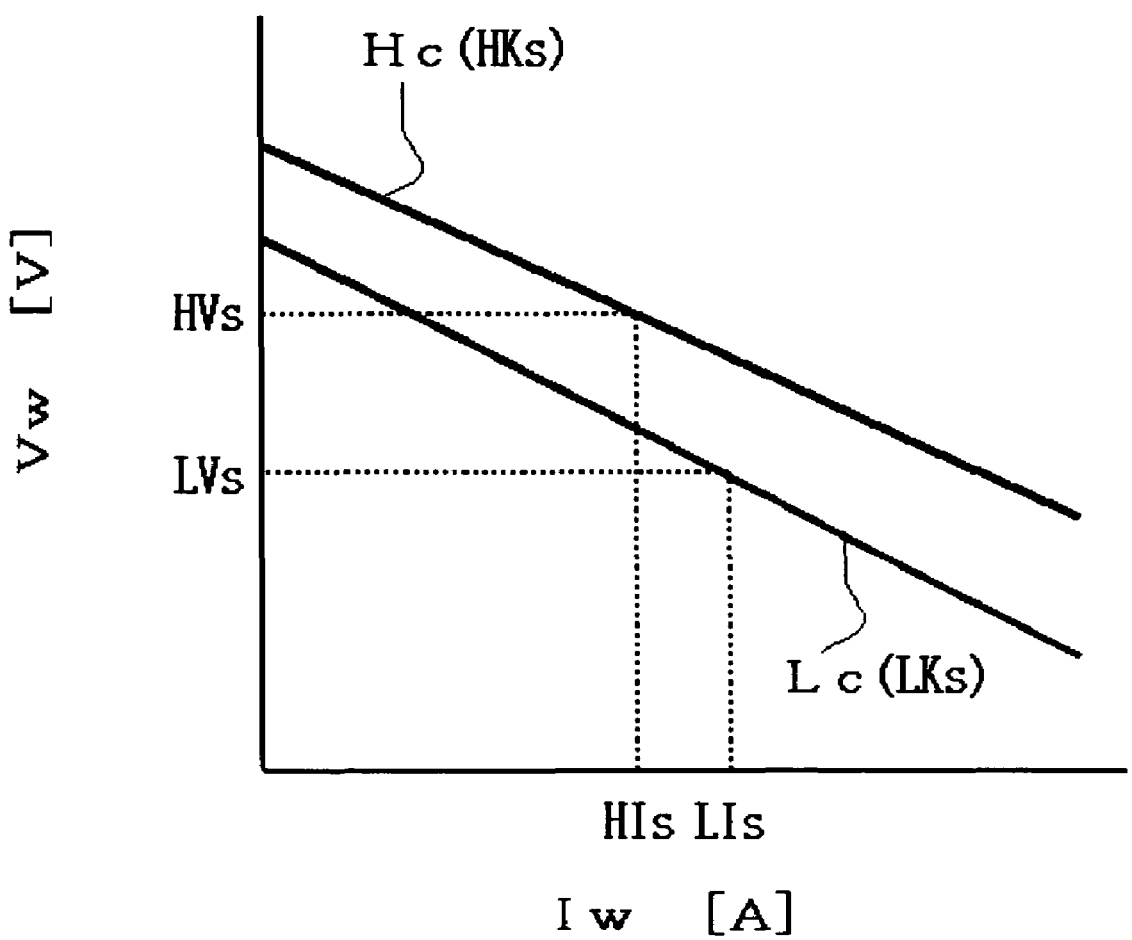
FIG. 7 is an external characteristic diagram showing an example of high-arc-length characteristics Hc and low-arc-length characteristics Lc in said another embodiment of the present invention.

FIG. 7 is a diagram showing examples of the high-arc-length characteristics and low-arc-length characteristics. The mean value Iw of the welding current is shown on the horizontal axis, and the mean value Vw of the welding voltage is shown on the vertical axis. The characteristic Hc is a high arc length external characteristic, and is set by the slope Hks, welding current reference value HIs and welding voltage reference value HVs. The characteristic Lc is a low arc length external characteristic, and is set by the slope LKs, welding current reference value LIs and welding voltage reference value LVs. Both of these external characteristic are provided by the external characteristic forming method of the present invention described above. In order to ensure that the arc length in the case of the high arc length external characteristic Hc is higher than the arc length in the case of the low arc length external characteristic Lc, it is necessary to position the high arc length external characteristic Hc higher than the low arc length external characteristic Lc in the direction of the vertical axis. In order to accomplish this, it is necessary to set one or more of the three setting values (including the welding voltage reference value or welding current reference value) at a different value. Specifically, this setting method includes the following six cases.

(1) HKs=LKs, HVs≠LVs, HIs=LIs
(2) HKs≠LKs, HVs≠LVs, HIs=LIs
(3) HKs=LKs, HVs=LVs, HIs≠LIs
(4) HKs≠LKs, HVs=LVs, HIs≠LIs
(5) HKs=LKs, HVs≠LVs, HIs≠LIs
(6) HKs≠Lks, HVs≠LVs, HIs≠LIs

Figure 8:
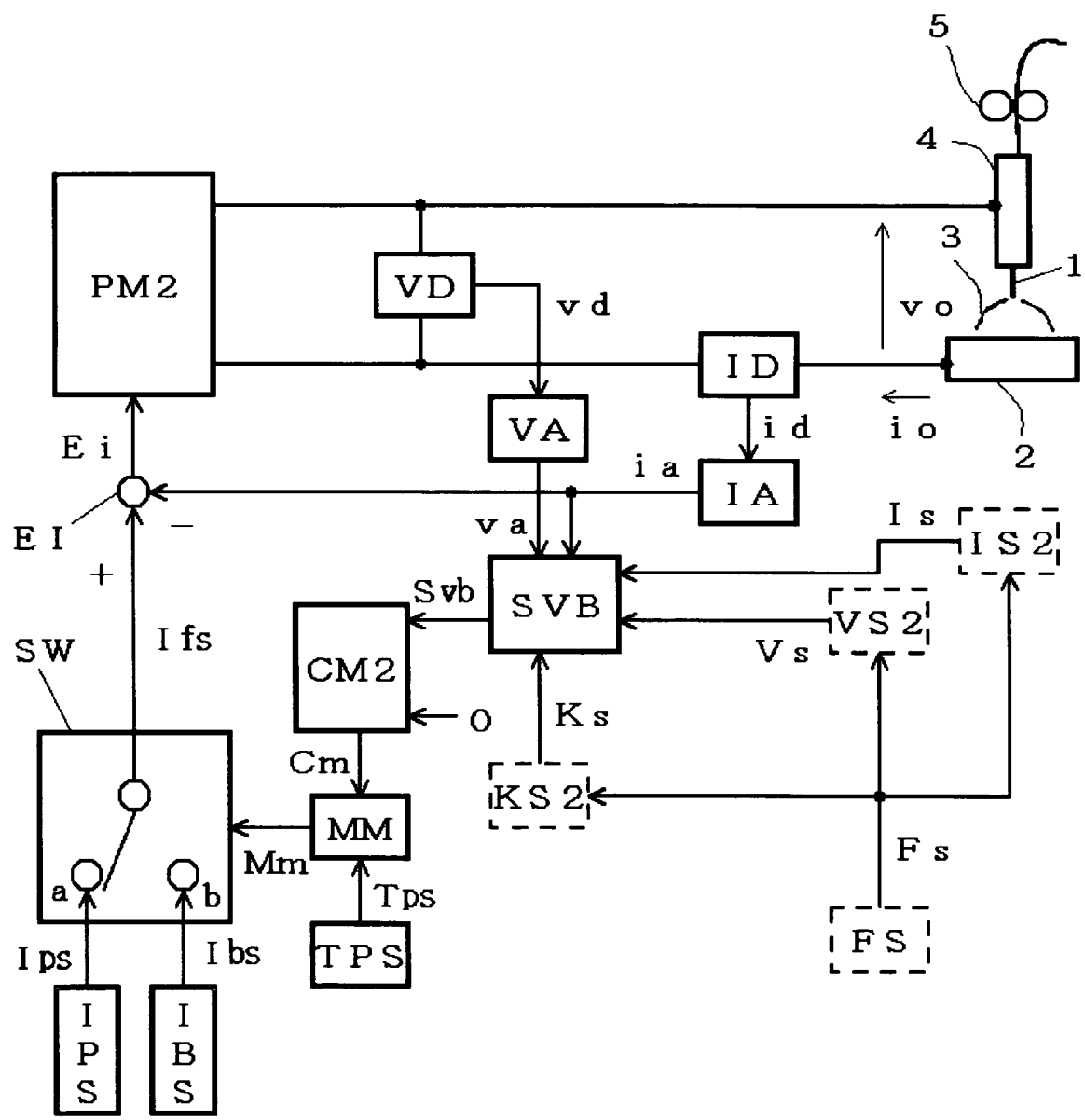
FIG. 8 is a block diagram of the welding power source in said another embodiment of the present invention.
Figure 9:
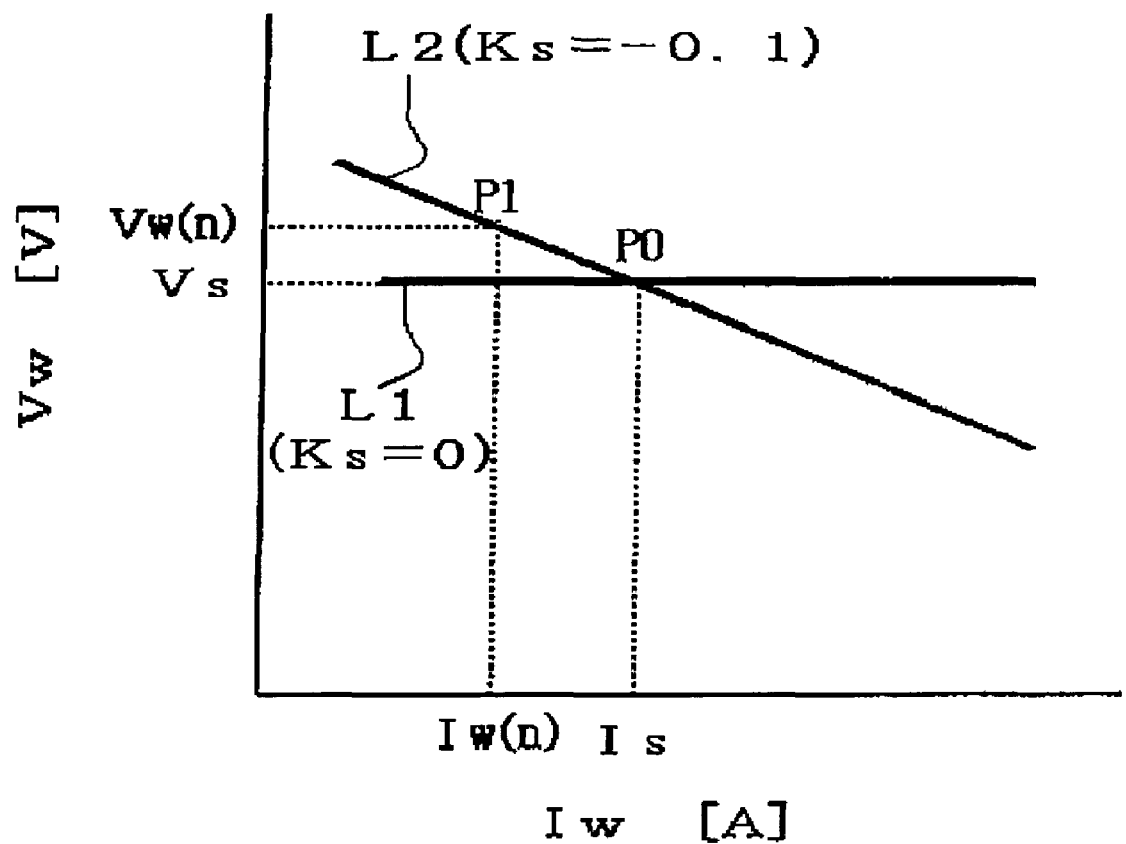
FIG. 9 is a diagram showing an example of external characteristics in the prior art.

FIG. 8 is a block diagram of a welding power source used for the arc length variation pulse arc welding. In this figure, blocks that are the same as blocks in FIG. 1 are labeled with the same symbols, and a description of these blocks is omitted. Blocks indicated by a dotted line, which differ from the blocks in FIG. 1, will be described below.

The arc length switching circuit FS outputs an arc length switching signal Fs that assumes a high level during a predetermined high arc length period, and that assumes a low level during a predetermined low arc length period. The second welding voltage reference value setting circuit VS2 outputs a predetermined high welding voltage reference value HVs as a welding voltage reference value setting signal Vs when the arc length switching signal Fs is at a high level, and outputs a predetermined low welding voltage reference value LVs as a welding voltage reference value setting signal Vs when the arc length switching signal Fs is at a low level. The second welding current reference value setting circuit IS2 outputs a predetermined high welding current reference value HIs as a welding current reference value setting signal Is when the arc length switching signal Fs is at a high level, and outputs a predetermined low welding current reference value LIs as a welding current reference value setting signal Is when the arc length switching signal Fs is at a low level. The second slope setting circuit KS2 outputs a predetermined high slope value HKs as a slope setting signal Ks when the arc length switching signal Fs is at a high level, and outputs a predetermined low slope value LKs as a slope setting signal Ks when the arc length switching signal Fs is at a low level.

The arc length variation pulse arc welding can also be applied to the direct-current pulse arc welding described above with reference to FIG. 10 or FIG. 3.

The invention claimed is:

1. An output control method for a pulse arc welding in which welding is performed by causing a welding current to flow for one pulse period including a peak period with a flow of a peak current and a base period with a flow of a base current, and by applying a welding voltage between a welding wire and a matrix material, the method comprising the steps of:
preliminarily setting external characteristics of a welding power source by a slope Ks, a welding current reference value Is and a welding voltage reference value Vs;
detecting an absolute value va of the welding voltage and an absolute value ia of the welding current during welding;
calculating integration $Svb=\int(Ks \times ia - Ks \times Is + Vs - va)dt$ from a starting point of an n-th pulse period;
ending the n-th pulse period when the integration Svb becomes no smaller than zero during a base period following a predetermined peak period; and
starting a (n+1)-th pulse period subsequent to the n-th pulse period.

2. The output control method according to claim 1, wherein the absolute value ia of the welding current is determined by using a current waveform setting value for setting a welding current waveform.

3. The output control method according to claim 1, wherein the external characteristics comprises high-arc-length characteristics for making an arc length relatively long and low-arc-length characteristics for making the arc length relatively short, the high-arc-length characteristics and the low-arc-length characteristics being periodically switched for varying the arc length periodically.

4. The output control method according to claim 3, wherein the high-arc-length characteristics are preliminarily set by a slope HKs, a welding current reference value HIs and a welding voltage reference value HVs, the low-arc-length characteristics being preliminarily set by a slope LKs, a welding current reference value LIs and a welding voltage reference value LVs, and wherein at least one of non-equal relations HVs≠LVs and HIs≠LIs is satisfied.

5. An output control method for a pulse arc welding in which welding is performed by causing a welding current to flow for one pulse period including a base period with a flow of a base current and a peak period with a flow of a peak current, and by applying a welding voltage between a welding wire and a matrix material, the method comprising the steps of:
preliminarily setting external characteristics of a welding power source by a slope Ks, a welding current reference value Is and a welding voltage reference value Vs;
detecting an absolute value va of the welding voltage and an absolute value ia of the welding current during welding;
calculating integration $Svb=\int(Ks \times ia - Ks \times Is + Vs - va)dt$ from a starting point of an n-th pulse period;
ending the n-th pulse period when the integration Svb becomes no greater than zero during a peak period following a predetermined base period; and
starting a (n+1)-th pulse period subsequent to the n-th pulse period.

6. The output control method according to claim 5, wherein the absolute value ia of the welding current is determined by using a current waveform setting value for setting a welding current waveform.

7. The output control method according to claim 5, wherein the external characteristics comprises high-arc-length characteristics for making an arc length relatively long and low-arc-length characteristics for making the arc length relatively short, the high-arc-length characteristics and the low-arc-length characteristics being periodically switched for varying the arc length periodically.

8. The output control method according to claim 7, wherein the high-arc-length characteristics are preliminarily set by a slope HKs, a welding current reference value HIs and a welding voltage reference value HVs, the low-arc-length characteristics being preliminarily set by a slope LKs, a welding current reference value LIs and a welding voltage reference value LVs, and wherein at least one of non-equal relations HVs≠LVs and HIs≠LIs is satisfied.

9. An output control method for a pulse arc welding in which welding is performed by causing a welding current to flow for one pulse period including a minus electrode period with a flow of a minus electrode current, a plus electrode peak period with a flow of a peak current and a base period with a flow of a base current, and by applying a welding voltage between a welding wire and a matrix material, the method comprising the steps of:

preliminarily setting external characteristics of a welding power source by a slope Ks, a welding current reference value Is and a welding voltage reference value Vs;

detecting an absolute value va of the welding voltage and an absolute value ia of the welding current during welding;

calculating integration $Svb=\int(Ks \times ia - Ks \times Is + Vs - va)dt$ from a starting point of an n-th pulse period;

ending the n-th pulse period when the integration Svb becomes no smaller than zero during a base period following a predetermined minus electrode period and a predetermined peak period; and starting a (n+1)-th pulse period subsequent to the n-th pulse period.

10. The output control method according to claim 9, wherein the absolute value ia of the welding current is determined by using a current waveform setting value for setting a welding current waveform.

11. The output control method according to claim 9, wherein the external characteristics comprises high-arc-length characteristics for making an arc length relatively long and low-arc-length characteristics for making the arc length relatively short, the high-arc-length characteristics and the low-arc-length characteristics being periodically switched for varying the arc length periodically.

12. The output control method according to claim 11, wherein the high-arc-length characteristics are preliminarily set by a slope HKs, a welding current reference value HIs and a welding voltage reference value HVs, the low-arc-length characteristics being preliminarily set by a slope LKs, a welding current reference value LIs and a welding voltage reference value LVs, and wherein at least one of non-equal relations $HVs \neq LVs$ and $HIs \neq LIs$ is satisfied.

* * * * *